P. C. FOX.
SPRING TIRE FOR VEHICLES.
APPLICATION FILED MAY 11, 1912.

1,049,071.

Patented Dec. 31, 1912.

2 SHEETS—SHEET 1.

Inventor
Porter C. Fox

Witnesses

By Victor J. Evans
Attorney

P. C. FOX.
SPRING TIRE FOR VEHICLES.
APPLICATION FILED MAY 11, 1912.

1,049,071.

Patented Dec. 31, 1912.

2 SHEETS—SHEET 2.

Witnesses

Inventor
Porter C. Fox

By Victor J. Evans
Attorney

UNITED STATES PATENT OFFICE.

PORTER C. FOX, OF SPOKANE, WASHINGTON, ASSIGNOR TO FOX SPRING TIRE COMPANY, INCORPORATED, OF SPOKANE, WASHINGTON, A CORPORATION OF WASHINGTON.

SPRING-TIRE FOR VEHICLES.

1,049,071. Specification of Letters Patent. Patented Dec. 31, 1912.

Application filed May 11, 1912. Serial No. 696,688.

*To all whom it may concern:*

Be it known that I, PORTER C. FOX, a citizen of the United States, residing at Spokane, in the county of Spokane and State of Washington, have invented new and useful Improvements in Spring-Tires for Vehicles, of which the following is a specification.

The invention relates to vehicle tires and more particularly to the class of spring tires for vehicles, automobiles or the like.

The primary object of the invention is the provision of a tire of this character in which the possibility of punctures or blow-outs thereto are eliminated, yet the tire possesses maximum elasticity for absorbing shocks and jars incident to the travel thereof.

Another object of the invention is the provision of a tire wherein the cover thereof conceals a series of springs of novel construction which absorb all shocks and jars incident to the travel of the tire and that avoid the necessity of inflating the same thereby increasing the life of the said tire as blow-outs and punctures will be eliminated.

A further object of the invention is the provision of a tire which possesses maximum elasticity without the use of compressed air for affording the requisite yielding qualities so as to assure comfort, and ease to the occupant of a vehicle when traveling over irregular surfaces and at the same time reducing the wear and tear upon the same as well as assuring increased life to the tire.

A still further object of the invention is the provision of a tire of this character which possesses simplicity and durability thus minimizing the cost of manufacture and also which is thoroughly reliable and efficient in its operation.

With these and other objects in view the invention consists in the construction, combination and arrangement of parts as will be hereinafter more fully described, illustrated in the accompanying drawings, and pointed out in the claims hereunto appended.

Figure 1:
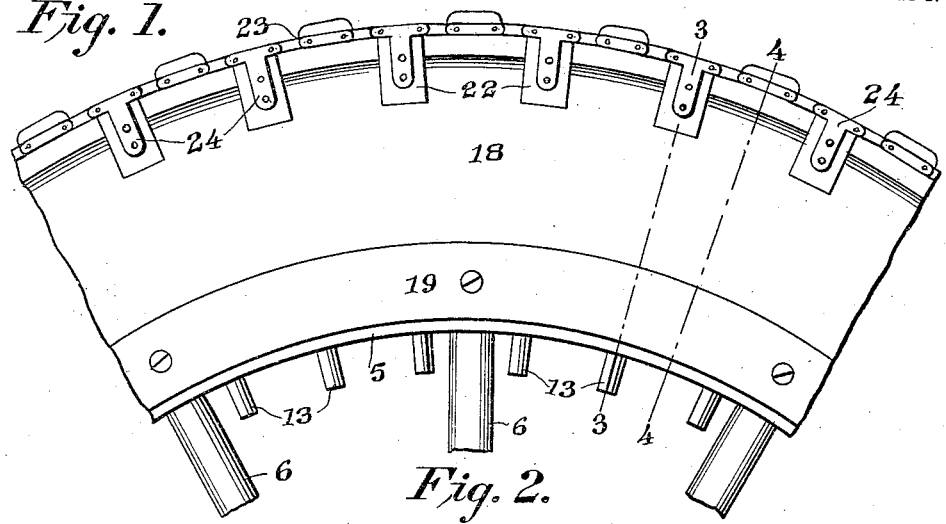
Figure 2:
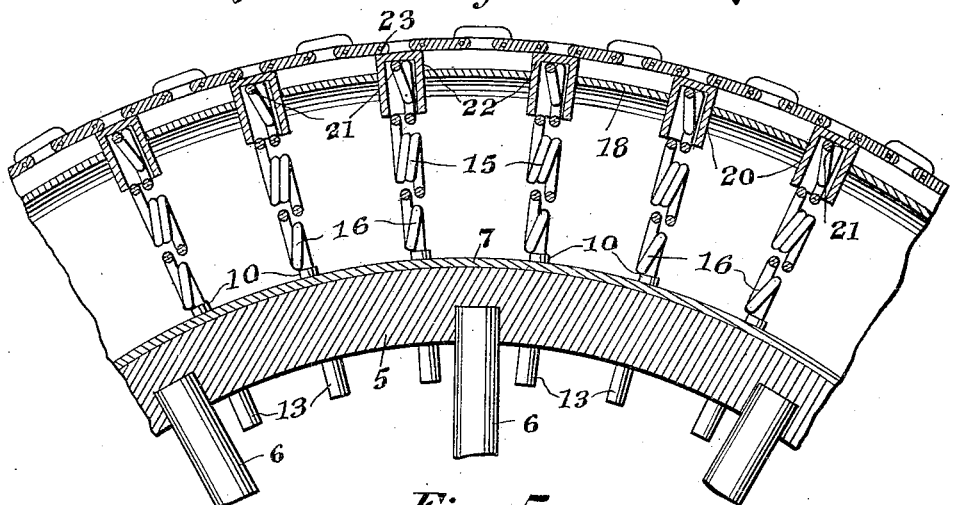
Figure 5:
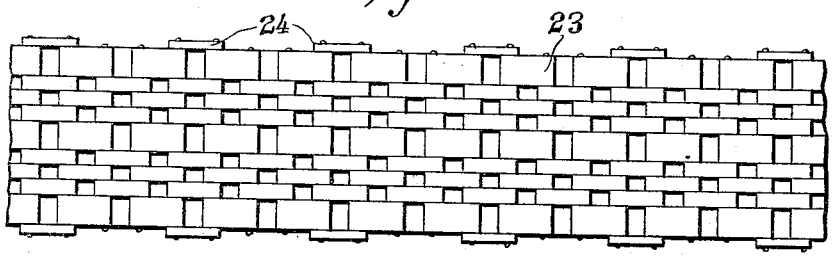
Figure 3:
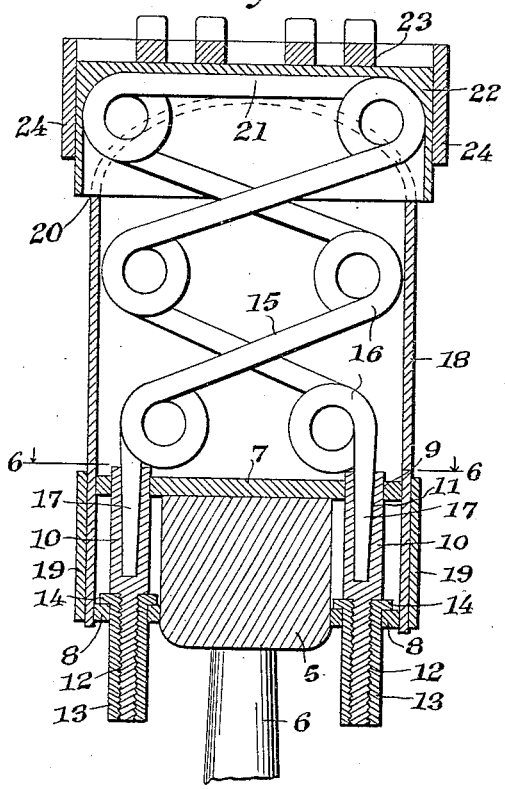
Figure 4:
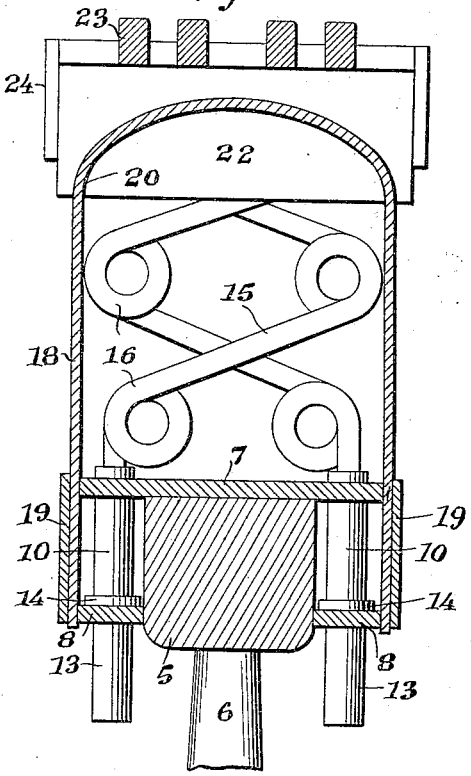
Figure 6:
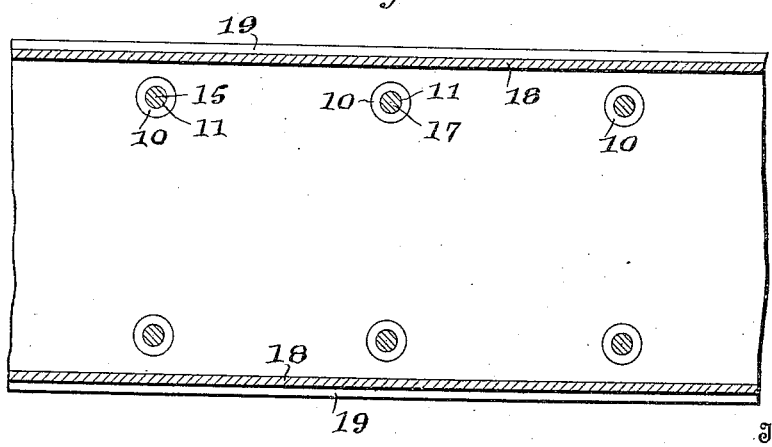

In the drawings:—Figure 1 is a fragmentary side elevation of a vehicle wheel showing a tire constructed in accordance with the invention applied thereto. Fig. 2 is a fragmentary vertical longitudinal sectional view through the tire. Fig. 3 is an enlarged transverse sectional view on the line 3—3 of Fig. 1. Fig. 4 is a similar view on the line 4—4 of Fig. 1. Fig. 5 is a fragmentary plan view looking toward the tread of the tire. Fig. 6 is a fragmentary sectional view on the line 6—6 of Fig. 3.

Similar reference characters indicate corresponding parts throughout the several views in the drawing.

Referring to the drawings by numerals 5 designates the felly and 6 the spokes of a vehicle wheel of the ordinary well-known construction, and upon said felly is bolted or otherwise secured an outer rim 7, while at opposite sides of the felly are bolted or otherwise secured inner rims 8, both of the said rims being provided at intervals with alining openings or apertures 9 in which are engaged spring adjusting devices presently described.

Each spring adjusting device comprises a post 10 formed in one end with a socket 11 and at its other end with a reduced threaded stem 12, the post 10 being slidably fitted in the opening or aperture 9 in the rims 7 while the stem 12 is passed through the opening or aperture in the rim 8, and is adjustably engaged in an internally threaded sleeve 13 which is fitted in the said opening or aperture in the rim 8, and is formed with an outturned circular-flange 14, which engages the inner face of the said rim 8 so as to become firmly seated thereon. On adjusting the sleeves 13 upon the stems 12 the posts 10 may be regulated for the tensioning of the springs presently described.

Each spring 15 is bent into toggle-shape and has a series of coils 16 each being located at the point of each bight therein, so as to afford maximum resiliency or elasticity thereto. The spring is provided with tapered ends 17 which detachably fit into the sockets 11 formed in the posts 10 for the rigid mounting thereof so that the same will project outwardly beyond the outer rim 7.

Incasing the springs 15 is a flexible cover 18 the edges of which are secured at opposite sides of the wheel to the inner and outer rims 7 and 8 by means of clamping plates or rings 19 which are secured to the said inner and outer rims in any desirable manner.

The outer casing or covering 18 at intervals is provided with transverse slots 20 through which project the closed flat ends 21 of the springs 15 which are received in removably mounted clips or cleats 22 carried by an endless tread band presently described.

The tread band comprises a chain-like body 23 having side portions 24 suitably fixed to the sides of the cleats 22, the body 23 being designed to present a roughened tread surface so constructed to prevent the skidding of the vehicle yet the said body is readily flexible, so as to assure elasticity to the tire when traveling upon the ground.

From the foregoing description, taken in connection with the accompanying drawings, it is thought that the construction and operation of the invention will be clearly understood, and therefore a more extended explanation has been omitted.

What is claimed is:—

1. The combination with a wheel felly of inner and outer rims fixed thereto and having alining perforations at intervals therein, internally threaded sleeves engaged in the perforations in the inner rim and resting against the same, socketed posts working through the perforations in the outer rim and having reduced externally threaded stems adjustably engaged in the sleeves, toggle-like springs having their ends engaged in the socketed posts, a casing inclosing the said springs and having slots through which the outer ends of the springs pass, and a tread band mounted upon the casing and having means for engagement with the projected ends of the spring and means securing the edges of the casing to the inner and outer rims.

2. The combination with a wheel felly of inner and outer rims fixed thereto and having alining perforations at intervals therein, internally threaded sleeves engaged in the perforations in the inner rim and resting against the same, socketed posts working through the perforations in the outer rim and having reduced externally threaded stems adjustably engaged in the sleeves, toggle-like springs having their ends engaged in the socketed posts, a casing inclosing the said springs and having slots through which the outer ends of the springs pass, recessed cleats disposed transversely upon the casing and receiving the ends of the said springs and a flexible tread annulus supported by said cleats.

3. The combination with a wheel felly of inner and outer rims fixed thereto and having alining perforations at intervals therein, internally threaded sleeves engaged in the perforations in the inner rim and resting against the same, socketed posts working through the perforations in the outer rim and having reduced externally threaded stems adjustably engaged in the sleeves, toggle-like springs having their ends engaged in the socketed posts, a casing inclosing the said springs and having slots through which the outer ends of the springs pass, recessed cleats disposed transversely upon the casing and receiving the ends of the said springs, a flexible tread annulus supported by said cleats, and means for securing the annulus to the cleats.

In testimony whereof I affix my signature in presence of two witnesses.

PORTER C. FOX.

Witnesses:
Z. A. PFILE,
D. J. COGDILL.

Copies of this patent may be obtained for five cents each, by addressing the "Commissioner of Patents, Washington, D. C."